3,380,968
NOVEL TERPOLYAMIDES FROM PHENYLINDAN CARBOXYLIC ACID
James S. Ridgway, Durham, N.C., assignor to Monsanto Company, St. Louis, Mo., a corporation of Delaware
No Drawing. Filed May 21, 1965, Ser. No. 457,806
6 Claims. (Cl. 260—78)

ABSTRACT OF THE DISCLOSURE

Terpolyamides having high boiling water shrinkage are composed of (A) 1 to 98 mole percent hexamethylene adipamide, (B) 1 to 98 mole percent hexamethylene 3-(4-carboxyphenyl) - 1,1,3 - trimethyl-5-indan carboxylamide, and (C) 1 to 50 mole percent hexamethylene terephthalamide. These terpolyamides are useful in the production of yarns, fabrics, films, textile fibers and reinforcing cords.

---

Polyamides, such as polyhexamethylene adipamide (nylon 66) and polycaproamide (nylon 6) are well known in the art and have found significant commercial success both as textile fibers and as reinforcing fibers, such as tire cord. Although the textile fibers obtained from previously known fiber-forming polyamides heretofore known are of great value, much research effort is being continuously expended in order to improve their properties. For example, these previously known polyamides all possess a relatively low shrinkage value, that is, the amount of shrinkage that occurs in fibers made from these polyamides when they are treated with boiling water is relatively small. In some commercial uses, for example, as hosiery, it is desirable that the polyamide textile fibers have increased shrinkage. Furthermore, in the production of conjugate fibers, that is, a fiber having two or more components, it is extremely desirable that at least one of the components have a relatively high boiling water shrinkage. This is necessary in order that the crimp in a conjugate fiber be significant and permanent.

While, as pointed out above, previously known polyamides have found significant use in the reinforcement of rubber articles such as vehicle tires, an inherent drawback in their use to reinforce vehicle tires is their tendency to flatspot. Flatspotting is a term used to describe the out-of-roundness that occurs when a polyamide reinforced vehicle tire is allowed to rest for a period of time. That portion of the tire which is in contact with the pavement becomes flattened and, when the vehicle is started again this flat spot causes vibration of the vehicle. While this phenomena of flatspotting is not completely understood, there is at present a great deal of effort being put into finding a solution of this problem as regards polyamide tire cords.

It is an object of this invention to provide a novel terpolyamide.

It is a further object of this invention to provide a novel synthetic linear fiber-forming terpolyamide which has increased boiling water shrinkage characeristics.

It is a further object of this invention to provide a novel synthetic linear terpolymer from a phenylindan dicarboxylic acid.

It is a still further object of this invention to provide a terpolyamide from a phenylindan dicarboxylic acid which shows a reduced tendency to flatspot when used as a reinforcing fiber in rubber vehicles tires.

It is a still further object of this invention to provide a textile fiber composed of this novel synthetic linear fiber-forming terpolyamide.

It is a still further object of this invention to provide a process for producing a novel synthetic linear fiber-forming terpolyamide.

These and other objects will become apparent from the description given hereinafter.

The terpolyamides of the present invention are useful in the production of shaped articles by extrusion, molding or casting in the nature of yarns, fabrics, films, pellicles, bearings, ornaments or the like. They are particularly useful in the production of textile fibers and as reinforcing cords produced therefrom.

The present invention provides a novel linear fiber-forming terpolyamide composed of (A) 1 to 98 mole percent, based on the molecular weight of the polyamide, of units represented by the structure

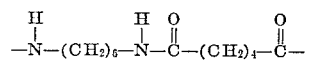

(B) 1 to 98 mole percent, based on the molecular weight of the terpolyamide, of units represented by the structure

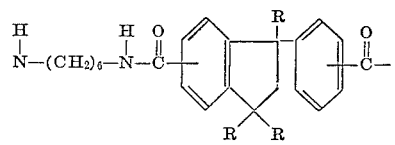

wherein R is selected from the group consisting of hydrogen and alkyl groups containing 1–3 carbon atoms, and (C) 1 to 50 mole percent, based on the molecular weight of the terpolyamide of units represented by the structure

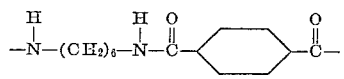

In a typical preparation, the terpolyamide is formed by interpolymerizing (A) substantially equimolecular proportions of adipic acid and hexamethylene diamine, (B) substantially equimolecular proportions of a phenylindan dicarboxylic acid and hexamethylene diamine, and (C) substantially equimolecular proportions of terephthalic acid and hexamethylene diamine wherein component (A) is present in an amount sufficient to provide 1–98, preferably 30–60 mole percent of the final terpolymer, component (B) is present in an amount sufficient to provide 1–98, preferably 10 to 50 mole percent of the final terpolymer and component (C) is present in an amount sufficient to provide 1 to 50, preferably 20 to 50 mole percent of the final terpolymer. It is, of course, obvious that the total mole percentage will not exceed 100 percent. It will be understood that the designation "equimolecular proportions" of the diamines and the diacids includes the performed salt reaction products thereof.

The terpolyamides of this invention are prepared by procedures well known in the art and commonly employed in the manufacture of simple polyamides. That is, the reactants are heated at a temperature of from 180° C. to 300° C. and preferably from 200° C. to 295° C. until the product has a sufficiently high molecular weight to exhibit fiber-forming properties, which properties are reached when the terpolyamide has an intrinsic viscosity of at least 0.4. The reaction can be conducted at superatmospheric, atmospheric or subatmospheric pressure. Often it is desirable, especially in the last stage of the reaction, to employ conditions, e.g. reduce pressure, which will aid in the removal of the reaction by-products. Preferably the reaction is carried out in the absence of oxygen, for example, in an atmosphere of nitrogen.

Intrinsic viscosity as employed herein is defined as $$c \xrightarrow{\text{Lim}} 0 \left( \frac{\log_e N_r}{c} \right)$$

in which $N_r$ is the relative viscosity of a dilute solution of the polymer in m-cresol in the same units at the same temperature and C is the concentration of grams of polymer per 100 cc. of solution.

The amount of component (A) present in the terpolymers of the present invention ranges from 1 to 98, preferably 30 to 60 mole percent based on the molecular weight of the terpolymer. Component (B) is present in the terpolymer in an amount of from 1 to 98, preferably 10 to 50 mole percent based on the weight of the terpolymer and component (C) is present in an amount of between 1 to 50, preferably 20 to 50 mole percent based on the molecular weight of the final terpolymer. It has been found that the terpolymer compositions thus prepared have a substantially increased boiling water shrinkage and show a great decrease in their tendency to flatspot when they are used as reinforcing fibers for vehicle tires.

The phenylindan carboxylic acids which are employed in the preparation of the terpolymers of the present invention may be represented by the formula:

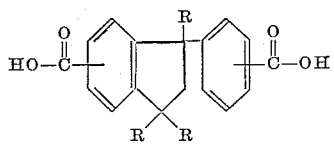

wherein R is as defined above. Typical suitable compounds falling within this formula are:

3-(4-carboxyphenyl)-5-indan carboxylic acid;
3-(3-carboxyphenyl)-5-indan carboxylic acid;
3-(4-carboxyphenyl)-1,1,3-trimethyl-5-indan carboxylic acid;
3-(3-carboxyphenyl)-1,1,3-triethyl-6-indan carboxylic acid;
3-(4-carboxyphenyl)-1-methyl-1,3-dipropyl-5-indan carboxylic acid;
3-(4-carboxyphenyl)-1-methyl-1,3-diethyl-6-indan carboxylic acid, and the like.

The preferred phenylindan dicarboxylic acid for the preparation of the terpolyamides of this invention is 3-(4-carboxyphenyl)-1,1,3-trimethyl-5-indan carboxylic acid which is represented by the formula

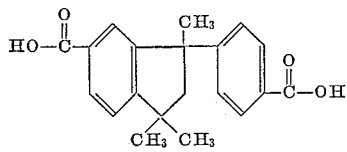

In order to illustrate the invention and the advantages thereof with greater particularity, the following specific example is given. It is to be understood that it is intended to be only illustrative and not limitative. Parts are given by weight unless otherwise indicated.

EXAMPLE I

A solution was prepared containing 88.2 parts (60 mole percent) of hexamethylenediammonium adipate, 24.7 parts (10 mole percent) of the hexamethylenediammonium salt of 3-(4-carboxyphenyl)-1,1,3-trimethyl-5-indan carboxylic acid, and 47.6 parts (30 mole percent) of hexamethylenediammonium terephthalate dissolved in 80 parts of water. This solution was added to a stainless steel high pressure autoclave which had been previously purged of air by the use of purified nitrogen. The temperature and pressure were slowly raised to 243° C. and 250 p.s.i.g. respectively, during which time there was the continuous removal of steamed condensate. At this point the pressure was gradually reduced to atmospheric over a 25-minute period and the polymer melt was allowed to equiliberate for 30 minutes at 280° C. The polymer thus obtained had a melting point of approximately 265° C.

This finished polymer was melt spun directly from the autoclave through a single-hole spinneret yielding a monofilament transparent yarn possessing good textile properties. The tenacity of the yarn after being drawn over a hot pin (90° C.) was determined to be 4.91 grams per denier.

Comparative tests were conducted to determine relative boiling water shrinkage in comparison to a conventional polyhexamethylene adipamide (nylon 66) yarn. The yarns were exposed to boiling water for a period of 5 minutes and their lengths were measured both before and after exposure. The percent boiling water shrinkage is determined by the following formula:

$$\frac{\text{length before exposure} - \text{length after exposure}}{\text{length before exposure}} \times 100 = \text{percent boiling water shrinkage}$$

The yarn prepared according to Example I had a boiling water shrinkage value of 34.3% compared to 10.3% for conventional polyhexamethylene adipamide yarn. It can be seen therefore, that this indicates an improvement of more than 200%.

Yarns made from the terpolyamides of the present invention were formed into cords and used to reinforce rubber vehicle tires. The tires thus formed were tested for flatspot severity and were found to have a significant reduction in the amount of flatspot when compared to conventional polyhexamethylene adipamide reinforced tires. This reduction in flatspot was maintained over a variety of conditions of temperature and humidity, thus eliminating the need for any additional additive to counteract the effect of atmospheric changes.

As many widely different embodiments of this invention may be made without departing from the spirit and scope thereof, it is to be understood that the invention is not to be limited by the specific embodiments set forth herein but only by the claims which follow.

I claim:
1. A linear fiber-forming terpolyamide composed of (A) 1 to 98 mole percent based on the molecular weight of the terpolyamide of units represented by the structure

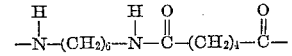

(B) 1 to 98 mole percent based on the molecular weight of the terpolyamide of units represented by the structure

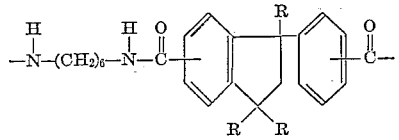

wherein R is selected from the group consisting of hydrogen and alkyl groups containing 1–3 carbon atoms and (C) 1 to 50 mole percent based on the molecular weight of the terpolyamide of units represented by the structure

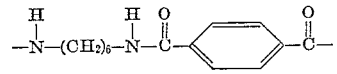

2. The linear fiber-forming terpolyamide as defined in claim 1 wherein R is methyl.

3. A linear fiber-forming terpolyamide composed of (A) 30 to 60 mole percent based on the molecular weight of the terpolyamide of units represented by the structure

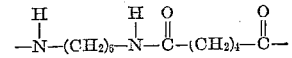

(B) 10 to 50 mole percent based on the molecular weight of the terpolyamide of units represented by the structure

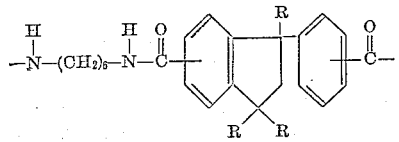

wherein R is selected from the group consisting of hydrogen and alkyl groups containing 1–3 carbon atoms and (C) 20 to 50 mole percent based on the molecular weight of the terpolyamide of units represented by the structure

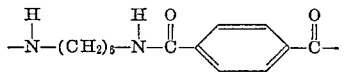

4. The linear fiber-forming terpolyamide as defined in claim 3 wherein R is methyl.

5. A textile fiber composed of the terpolyamide as defined in claim 1.

6. A textile fiber composed of the terpolyamide as defined in claim 3.

References Cited
UNITED STATES PATENTS

| | | | |
|---|---|---|---|
| 2,913,433 | 11/1959 | Wittbecker | 260—78 |
| 2,918,454 | 12/1959 | Graham | 260—78 |
| 3,145,193 | 8/1964 | Gabler | 260—78 |

WILLIAM H. SHORT, *Primary Examiner.*

H. D. ANDERSON, *Assistant Examiner.*